United States Patent [19]

Kraus

[11] Patent Number: 4,464,946

[45] Date of Patent: Aug. 14, 1984

[54] CONTROL ARRANGEMENT FOR THE SUPPLY OF LUBRICANT TO THE BEARINGS OF AN INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 461,108

[22] Filed: Jan. 26, 1983

[51] Int. Cl.³ .................. F16H 15/08; F16H 57/04; F01M 1/00; F16N 17/06

[52] U.S. Cl. .................................... 74/200; 74/201; 74/467; 184/6

[58] Field of Search ............... 184/6, 7 R; 123/196 R; 74/199, 200, 201, 190, 467

[56] References Cited

U.S. PATENT DOCUMENTS

| | | | |
|---|---|---|---|
| 3,087,348 | 4/1963 | Kraus | 74/200 |
| 3,163,050 | 12/1964 | Kraus | 74/200 |
| 3,163,051 | 12/1964 | Kraus | 74/200 |
| 3,486,391 | 12/1969 | Kraus | 74/200 |
| 3,486,582 | 12/1969 | Carter et al. | 123/196 R |
| 3,908,798 | 9/1975 | Binder | 123/196 R |

Primary Examiner—Lawrence J. Staab
Assistant Examiner—Michael D. Bednarek
Attorney, Agent, or Firm—Klaus J. Bach

[57] ABSTRACT

In an infinitely variable traction roller transmission with traction rollers arranged between, and in engagement with, opposite toric discs for the transmission of motion therebetween, the traction rollers and the toric discs are axially supported by hydrostatic axial thrust bearings supplied with lubricant by a single high pressure lubricant pump through high pressure lubricant branch conduits each including a flow control orifice to limit the high pressure lubricant supply to each bearing and a low pressure lubricant supply including a pressure reducing valve and having branch conduits to the various bearings with a check valve in each branch conduit to prevent backflow of lubricant from the high pressure branch conduits such that the high load bearings are always supplied with high pressure lubricant and the low load, high speed bearings obtain additional low pressure lubricant which increases the lubricant film thickness in the bearings and thereby greatly reduces shear losses in the high speed bearings.

9 Claims, 3 Drawing Figures

CONTROL ARRANGEMENT FOR THE SUPPLY OF LUBRICANT TO THE BEARINGS OF AN INFINITELY VARIABLE TRACTION ROLLER TRANSMISSION

BACKGROUND OF THE INVENTION

The invention relates to a control arrangement for the supply of lubricant to various bearings of an infinitely variable traction roller transmission or other apparatus having various hydrostatic bearings exposed to different loads under different operating conditions.

In traction roller transmissions, the traction rollers are disposed between, and in engagement with, toric discs and mounted on support trunnions which, when pivoted, cause engagement of the traction rollers with the toric discs in circles of varying diameters depending on the desired transmission ratio. The toric discs are mounted on input and output shafts and held in engagement with the traction rollers by axial thrust bearings which are subjected to varying loads depending on the torque transmitted through the transmission and depending on the pivot position of the traction rollers, that is, on the transmission ratio at which the transmission is operating. For any particular transmission ratio a change of torque results in a corresponding change in the bearing loads; however, any change in the transmission ratio results in different load changes for the bearings even if the power supplied to the transmission remains unchanged.

Generally, the load on the toric output disc bearing decreases as the speed-up ratio and the speed of the output shaft increase whereas the load on the toric input disc bearing increases and vice versa. If the axial thrust bearings of the toric disc are hydrostatic bearings supplied by a common lubricant source, problems in the lubricant distribution may arise: On one hand, it is necessary to insure sufficient lubricant supply to the higher loaded bearing, and on the other hand, it would be advantageous to supply an increased amount of lubricant to the lower loaded, high speed, disc bearing in order to increase the lubricant film thickness in the bearing and thereby substantially decrease shear losses.

SUMMARY OF THE INVENTION

In order to achieve the desired lubricant distribution with only one lubricant pump, an infinitely variable traction roller transmission with traction rollers pivotally arranged between, and in engagement with, opposite toric input and output traction discs and with the toric discs and traction rollers being axially supported by hydrostatic axial thrust bearings, the axial thrust bearings are supplied with high pressure lubricant through branch conduits including flow control orifices to limit the high pressure lubricant supply to each bearing and a low pressure lubricant supply including a pressure reducing valve and having branch conduits to the various bearings with a check valve in each branch conduit to prevent backflow of lubricant into the low pressure lubricant system. The pump is sized to supply lubricant in excess of the amount required for the high pressure supply so that sufficient (high pressure) fluid is always supplied to all bearings through the high pressure lubricant supply system. The excess lubricant enters the low pressure lines and is supplied through the low pressure branch conduits to the bearings which, under the operating conditions, are under low load. In a traction roller transmission with which the present invention is concerned, the low load bearings are at the same time high speed bearings, which, as a result, receive an increased amount of lubricant such that the lubricant film thickness in these bearings is increased and the shear losses in these high speed bearings are substantially reduced.

SHORT DESCRIPTION OF THE DRAWINGS

DESCRIPTION OF THE PREFERRED EMBODIMENT

Figure 1:
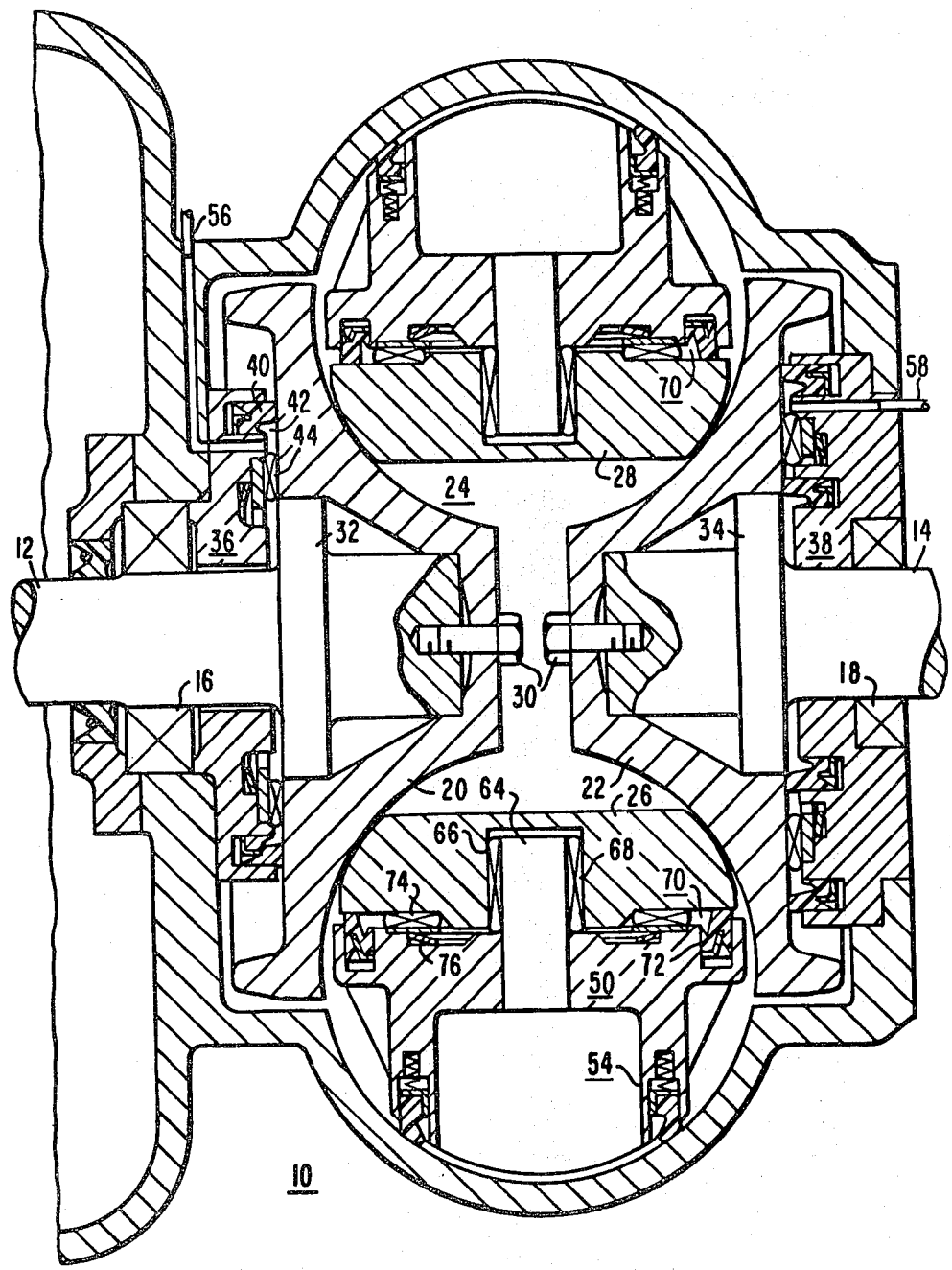
FIG. 1 is a cross-sectional view of a traction roller transmission of the type with which the present invention may be used.

A traction roller transmission as shown in FIG. 1 comprises a housing 10 with coaxial input and output shafts 12 and 14 rotatably supported therein by bearings 16 and 18. Associated with the input and output shafts 12 and 14 are toric traction discs 20 and 22 which are so arranged opposite each other that a toric cavity 24 of circular axial cross-section is defined therebetween. Traction rollers 26 and 28 are rotatably supported within the toric cavity 24 and are in engagement with the toric traction discs 20 and 22 for the transmission of motion therebetween.

As shown in FIG. 1, the toric traction discs 20 and 22 may be mounted on the ends of shafts 12 and 14 by screws 30 and seated on flanges 32 and 34. Axial support is provided for the traction discs 20 and 22 by axial bearing structures 36 and 38. Each axial bearing structure includes a hydrostatic bearing comprising the area within a limited leakage seal ring 40 which is axially slidably disposed within an annular seal ring cavity 42. A mechanical axial thrust bearing 44 may be provided for minimum bearing support to avoid damage during start-up operation or when, for any reason, insufficiently pressurized fluid is supplied to the hydrostatic axial thrust bearing.

The traction rollers 26 and 28 are rotatably supported on a pivot trunnion structure 50 which permits pivoting of the traction rollers about axes normal to a plane which includes the input and output shaft axis to provide for engagement of the traction rollers 26 and 28 with the toric discs 20 and 22 at circles of different diameters for the adjustment of various power transmission ratios between the input and output shafts 12 and 14.

The pivot trunnion structure 50 may be pivotally supported by pivot bearings as shown for example in applicants' U.S. Pat. No. 3,810,398 or may be supported hydraulically directly on the housing by a hydrostatic trunnion back-up structure 54 as it is described in detail in applicants' earlier application Ser. No. 445,121, filed Jan. 3, 1983.

As shown in FIG. 1 a traction roller 26 is supported on the trunnion structure 50 by a hydrostatic bearing structure 70 defined by a limited leakage seal ring 72, the traction roller 26 being positioned on the trunnion by a shaft 64 which projects from the trunnion structure 50 into a bore 66 in the roller 26. Roller bearings 68 are provided for radial support of the traction roller 26. A back-up axial thrust roller bearing 74 is provided for supporting the traction roller when insufficiently pressurized fluid is supplied to the bearing structure 70 as, for example, during start-up. The back-up bearing 74 is supported axially movably and engaged by a Belleville spring 76 in order to keep the traction roller 26 in engagement with the toric discs 20 and 22 at all times.

Figure 2:
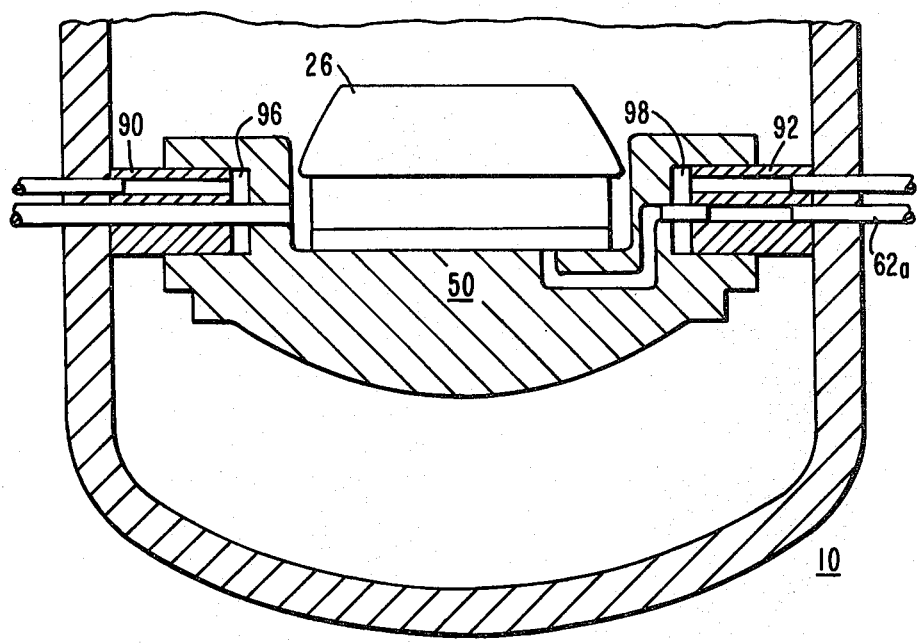
FIG. 2 shows schematically a lubricant supply arrangement for the hydrostatic bearings of such a transmission.

A pivotal support arrangement for the trunnion is schematically shown in FIG. 2. The trunnion 50 is supported axially movably on pistons 90 and 92 extending into cylinders 96 and 98 formed in the trunnion to permit initiation of a change of a transmission ratio. In connection with the present invention, however, it is important to note that hydraulic fluid supply lines are provided for supplying pressurized fluid to the various bearings of the transmission, that is, the hydrostatic traction roller bearing structures 70, hydrostaic axial thrust bearing structure 36 for the input toric disc 20, and hydrostatic axial thrust bearing structure 38 for the output toric disc 22. Lubricant is supplied to the axial thrust bearing structures 36 and 38 through lubricant supply lines 56 and 58, respectively, and to the traction roller bearing structures 70 through lubricant supply lines 62a shown in FIG. 2 only for one traction roller 26.

Figure 3:
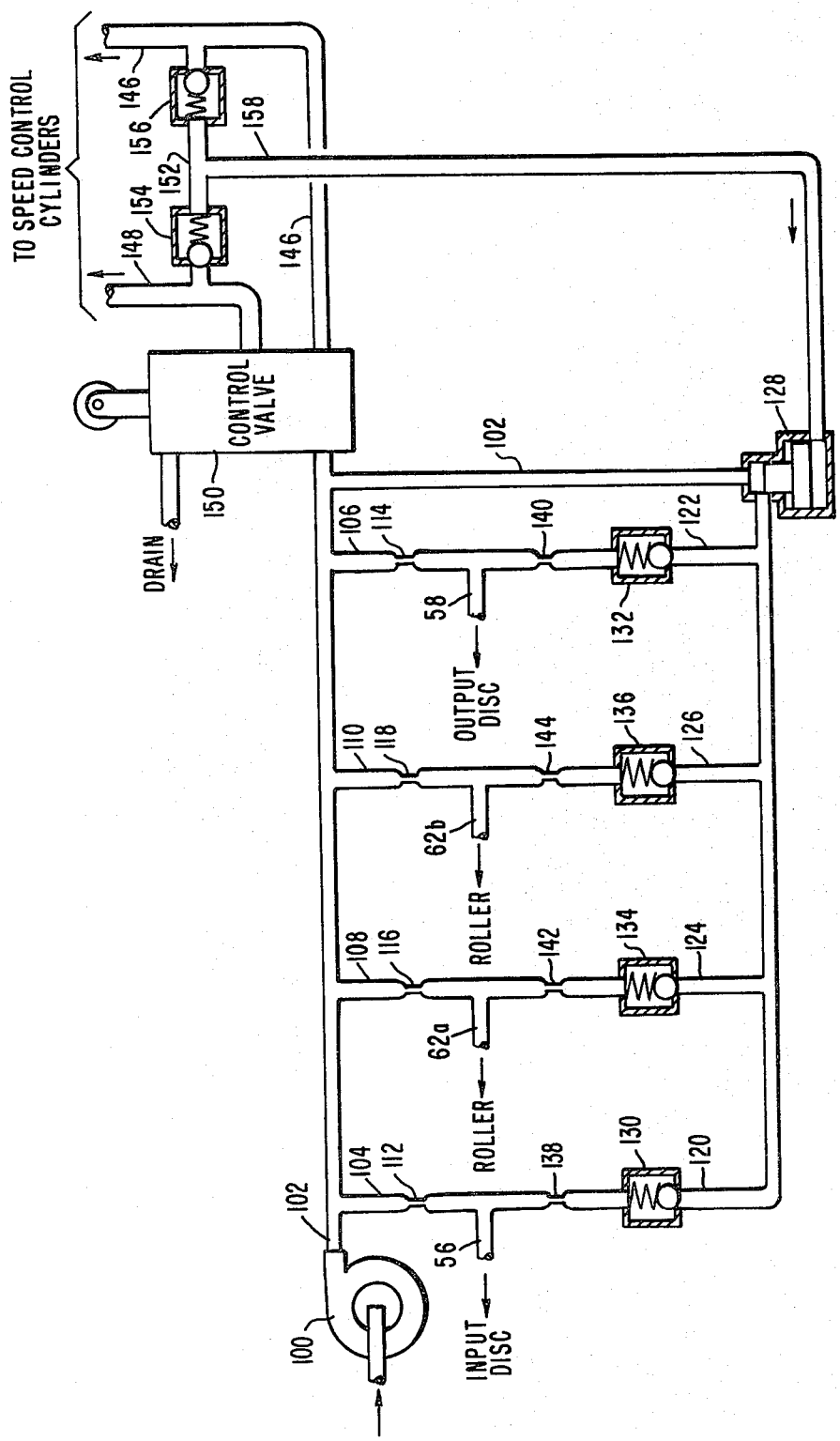
FIG. 3 shows schematically a lubricant supply control arrangement for the various hydrostatic axial thrust bearings.

FIG. 3 shows the lubricant supply arrangement according to the invention. Pressurized lubricant for all bearings and the ratio control cylinders is supplied by a pump 100. A high pressure pump outlet line 102 from the pump 100 has branch conduits 104 to 110 for supplying high pressure lubricant to, respectively, the input toric disc bearing 36, the output toric disc bearing 38 and the traction roller axial thrust bearings 70. The conduits 104 to 110 each include flow restricting orifices 112, 114, 116 and 118 which provide for a predetermined lubricant flow distribution to the various bearings, the flow orifices being so selected as to provide at least minimum flow under the highest possible bearing load. The pump volume of pump 100 is substantially higher than the combined flow through the orifices 112 to 118 and the relatively small amount required for speed control of the transmission. The excess lubricant is also supplied to the various bearings through a second set of branch conduits 120, 122, 124 and 126 which receive lubricant from pump outlet line 102 through a throttle control valve 128 which may simply be a spring loaded pressure reduction valve providing for a predetermined lower fluid pressure in the branch conduits 120 to 126 or, as shown in the drawing, a differential valve so that the pressure in the branch conduits depends on the pressure of the fluid supplied to the speed control cylinders 96 or 98.

The low pressure branch conduits 120 to 126 join the respective high pressure conduits 104 to 110 for supplying lubricant to the various bearings through bearing conduits 56, 58, 62a and 62b. All low pressure branch conduits 120 to 126, however, include check valves 130, 132, 134 and 136 which prevent backflow of high pressure lubricant. Preferably, they also include flow orifices 138 to 144 for better distribution of the low pressure lubricant.

The pressure of the lubricant supplied by the throttle control valve 128 is so selected as to be lower than the pressure in the bearings under the highest load but higher than the pressure in the bearings under low load. The low load bearings are the high speed bearings which, as a result, receive increased amounts of lubricant such that the thickness of the lubricant film in these bearings is increased and the shear losses are substantially reduced. However, the low speed, high load bearings will always receive sufficient lubricant through the high pressure lubricant conduits 104 to 108 which carry full predetermined flow essentially independent of the flow through the low pressure conduits 120 to 126.

To control the pressure level adjusted by the differential valve 128, the higher pressure of the lubricant in the speed ratio control cylinders 96 and 98 is preferably used. The supply lines 146 and 148 from the transmission ratio control valve 150 are therefore joined by a connecting passage 152 provided with check valves 154 and 156 between which the pressure control line 158 to the differential valve 128 is connected. The low pressure is then determined by the pressure in one control line when torque is transmitted in one direction and by the pressure in the other control line when torque is transmitted through the transmission in the opposite direction. The control valve is a four-way valve, for example, as used in applicants' copending application Ser. No. 301,442, filed Sept. 11, 1981.

With this arrangement, different amounts of lubricant can be supplied to different bearings under different operating conditions with only one pressurized lubricant supply source while, at the same time, insuring that the minimum necessary amount is supplied under any condition. The high load, low speed, bearings obtain all the lubricant needed for safe operation, whereas the low load, high speed bearings are supplied with additional lubricant to provide for a lubricant film of increased thickness which greatly reduces shear losses in the high speed bearings.

I claim:

1. An infinitely variable traction roller transmission comprising a housing, coaxial input and output toric traction roller discs rotatably supported in said housing, said toric discs having toric traction surfaces arranged opposite each other so as to define therebetween a toric cavity of circular cross-section; at least two motion transmitting traction rollers arranged in radial symmetry between, and in engagement with, said toric discs for the transmission of motion therebetween; a pivotal support structure rotatably supporting said traction rollers and being pivotally supported in said housing so as to permit changing of the ratio of motion transmission between said input and output toric discs, said toric discs and said traction rollers being axially supported by hydrostatic axial thrust bearings; and pressurized lubricant supply means for supplying pressurized lubricant to said hydrostatic axial thrust bearings, said pressurized lubricant supply means including a high pressure lubricant source, a high pressure lubricant supply line including branch conduits extending between said high pressure source and each hydrostatic axial thrust bearing, each branch conduit including a flow limiting orifice for supplying a predetermined amount of high pressure lubricant to each hydrostatic axial thrust bearing and a low pressure lubricant supply line with low pressure branch conduits to the various hydrostatic axial thrust bearings, said low pressure lubricant supply line being connected so as to receive lubricant from said high pressure lubricant source and including a pressure reducing valve for supplying low pressure fluid to said low pressure branch conduit, and a check valve arranged in each low pressure branch conduit so as to prevent backflow of high pressure fluid through said low pressure lubricant branch conduits, said pressure reducing valve being adapted to provide a lubricant having a pressure lower than the lubricant pressure in the highest load axial thrust bearing but higher than in the lowest load axial thrust bearing so as to cause additional lubricant from said low pressure branch conduits to be supplied to the low load axial thrust bearings thereby to increase the lubricant film thickness in said low load (high speed) axial thrust bearings for reduced shear losses.

2. A traction roller transmission as claimed in claim 1, wherein said traction rollers are pivotally supported on trunnions being axially controllably movable by a hydraulic motor supplied with control fluid from said high pressure pump by a control line including a ratio control valve and wherein said pressure reducing valve is a differential pressure valve operated by the control fluid pressure in the control fluid line so as to provide a lubricant pressure in said low pressure branch conduits which depends on the pressure of said control fluid.

3. A traction roller transmission as claimed in claim 2, wherein control pistons and cylinders are arranged at opposite ends of said trunnions and different control fluid lines extend from said ratio control valve to the cylinders at opposite ends of said trunnions and wherein means are provided for supplying the higher pressure control fluid of said different control lines to said differential valve.

4. A traction roller transmission as claimed in claim 3, wherein said differential control valve is in communication with both said different control lines by connecting lines including check valves providing for communication of said differential control valve with that of said different ratio control lines carrying the higher pressure control fluid.

5. A traction roller transmission as claimed in claim 1, wherein each of said low pressure branch conduits includes a low pressure flow control orifice for even distribution of the low pressure lubricant to bearings being under low load.

6. An arrangement for supplying lubricant from a single pressurized lubricant source to a number of hydrostatic bearings subjected to variably different relative loads, that is, high loads at low speeds and low loads at high speeds, said arrangement comprising a first conduit having branches providing communication between said lubricant source and said bearings, said branches including orifices for limiting the lubricant flow supplied to each bearing to a predetermined value, a second lubricant supply line with low pressure branches to the various hydrostatic bearings for supplying low pressure lubricant to said bearings, said second lubricant supply line being connected so as to receive lubricant from said lubricant source and including a pressure reducing valve for supplying low pressure lubricant to said low pressure branches; and a check valve arranged in each low pressure branch so as to prevent backflow of high pressure fluid through a low pressure branch when the associated bearing is under high load, said pressure reducing valve being selected so as to provide a lubricant of a pressure lower than the highest design pressure of said bearings but higher than the pressure in the lowest load bearings, thereby to cause additional lubricant from said low pressure branches to be supplied to the low load bearings for an increase in the lubricant film thickness in said low load (high speed) bearings.

7. An arrangement as claimed in claim 6, wherein said branches of said first conduit and the respective branches of said second conduit are joined and in communication with the respective bearings by single common conduits.

8. An arrangement as claimed in claim 6, wherein each of said low pressure branches includes a low pressure flow control orifice for even distribution of the low pressure lubricant to bearings being under relatively low load.

9. An arrangement as claimed in claim 6, wherein said lubricant source is a lubricant pump so selected as to provide a lubricant volume in excess of the amount capable of flowing through the orifices in the branches of the first conduit to all of said bearings.

* * * * *